(12) United States Patent
Gillet

(10) Patent No.: US 7,643,920 B2
(45) Date of Patent: Jan. 5, 2010

(54) SEAT-BELT PRETENSIONER ARRANGEMENT

(75) Inventor: Christophe Gillet, Levis Saint Norn (FR)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/868,072

(22) Filed: Oct. 5, 2007

(65) Prior Publication Data

US 2008/0023246 A1 Jan. 31, 2008

Related U.S. Application Data

(63) Continuation of application No. PCT/SE2006/000383, filed on Mar. 29, 2006.

(30) Foreign Application Priority Data

Apr. 7, 2005 (GB) ................................. 0507088.3

(51) Int. Cl.
*B60R 22/48* (2006.01)
(52) U.S. Cl. ........................................ 701/45; 180/268
(58) Field of Classification Search .................... 701/45
See application file for complete search history.

(56) References Cited

U.S. PATENT DOCUMENTS

| | | | |
|---|---|---|---|
| 5,552,986 A | 9/1996 | Omura et al. | |
| 5,605,202 A | 2/1997 | Dixon | |
| 5,788,281 A | 8/1998 | Yanagi et al. | |
| 6,257,363 B1 * | 7/2001 | Midorikawa et al. | 180/268 |
| 6,363,306 B1 * | 3/2002 | Palmertz et al. | 701/45 |
| 6,374,168 B1 * | 4/2002 | Fujii | 701/45 |
| 6,394,495 B1 * | 5/2002 | Specht | 280/806 |
| 6,626,463 B1 | 9/2003 | Arima et al. | |
| 6,726,249 B2 | 4/2004 | Yano et al. | |
| 6,766,875 B2 * | 7/2004 | Yamamoto | 180/282 |
| 6,846,019 B2 | 1/2005 | Tobata | |
| 6,908,112 B2 | 6/2005 | Yano et al. | |
| 7,057,503 B2 * | 6/2006 | Watson | 340/440 |
| 7,107,136 B2 | 9/2006 | Barta et al. | |
| 7,138,938 B1 | 11/2006 | Prakah-Asante et al. | |
| 7,178,622 B2 | 2/2007 | Eberle et al. | |
| 7,246,822 B2 | 7/2007 | Stanley | |

(Continued)

FOREIGN PATENT DOCUMENTS

EP 1 445 155 A1 8/2004

(Continued)

*Primary Examiner*—Thomas G Black
*Assistant Examiner*—Shelley Chen
(74) *Attorney, Agent, or Firm*—Brinks Hofer Gilson & Lione

(57) ABSTRACT

A seat-belt pretensioner arrangement comprises a pretensioner (7) and a control system (3-6) to control the tension applied to a seat-belt by the pretensioner (7). The control system (3-6) controls the pretensioner (7) in response to at least the rate of change of steering angle ($\delta'$). A first processor (4) provides an output indicating a desired level of force to be applied to the seat-belt determined from the steering angle and the velocity of the vehicle. A second processor (5) provides a corresponding output indicative of a desired force level, determined from the rate of change of steering angle ($\delta'$) and the velocity of the vehicle ($v_x$). A selector (6) selects the highest of the two force levels, and provides an appropriate signal to the pretensioner (7).

4 Claims, 1 Drawing Sheet

U.S. PATENT DOCUMENTS

| | | |
|---|---|---|
| 7,370,721 B2 | 5/2008 | Zelmer et al. |
| 2001/0025735 A1* | 10/2001 | Midorikawa et al. ......... 180/268 |
| 2002/0024211 A1 | 2/2002 | Yano et al. |
| 2002/0105416 A1* | 8/2002 | Kore ....................... 340/425.5 |
| 2002/0147535 A1 | 10/2002 | Nikolov |
| 2003/0173131 A1* | 9/2003 | Midorikawa et al. ......... 180/268 |
| 2003/0182041 A1* | 9/2003 | Watson ......................... 701/45 |
| 2004/0056471 A1* | 3/2004 | Bullinger et al. ............. 280/806 |
| 2004/0064246 A1 | 4/2004 | Lu et al. |
| 2004/0080204 A1* | 4/2004 | Enomoto et al. ............. 297/480 |
| 2004/0084890 A1 | 5/2004 | Tobata |
| 2004/0104570 A1* | 6/2004 | Midorikawa et al. ......... 280/807 |
| 2004/0195030 A1 | 10/2004 | Eberle et al. |
| 2004/0254710 A1* | 12/2004 | Yano ........................... 701/70 |
| 2005/0017494 A1* | 1/2005 | Midorikawa ............. 280/801.1 |
| 2005/0065688 A1* | 3/2005 | Rao et al. ..................... 701/45 |
| 2005/0077717 A1* | 4/2005 | Midorikawa ................ 280/806 |
| 2005/0149240 A1 | 7/2005 | Tseng et al. |
| 2005/0252710 A1 | 11/2005 | Akaba et al. |
| 2006/0089771 A1 | 4/2006 | Messih et al. |
| 2006/0108787 A1 | 5/2006 | Czaykowska |
| 2007/0163832 A1* | 7/2007 | Midorikawa ................ 180/268 |
| 2007/0228713 A1* | 10/2007 | Takemura ................... 280/753 |
| 2007/0276566 A1* | 11/2007 | Diebold et al. ................. 701/45 |
| 2008/0033616 A1* | 2/2008 | Gillet ........................... 701/45 |
| 2008/0071446 A1* | 3/2008 | Brauner et al. ................ 701/45 |
| 2008/0077289 A1* | 3/2008 | Fujishima .................... 701/29 |

FOREIGN PATENT DOCUMENTS

| | | |
|---|---|---|
| EP | 1 486 382 A2 | 12/2004 |
| GB | 2 372 822 B | 11/2002 |
| WO | WO 2004/005050 A1 | 1/2004 |
| WO | WO 2004/065182 A1 | 8/2004 |

* cited by examiner

SEAT-BELT PRETENSIONER ARRANGEMENT

This application claims priority to PCT/SE2006/000383, filed 29 Mar. 2006 and GB 0507088.3, filed 7 Apr. 2005.

FIELD OF THE INVENTION

The present invention relates to a seat-belt pretensioner arrangement, and more particularly relates to a seat-belt pretensioner arrangement for use in a vehicle, such as a motor vehicle, to apply tension to a seat-belt to reduce the risk of injury to a seat occupant in an accident situation.

BACKGROUND OF THE INVENTION

It has been proposed previously to provide seat-belt pretensioners which apply tension to a seat-belt in the event that an accident occurs. Many pretensioners of this type are actuated by a pyrotechnic charge, which generates gas to move a piston within a cylinder, the piston applying tension to a wire which is wound round the spindle of the seat-belt retractor so that seat-belt is wound into the retractor, thus tightening the seat-belt across the lap and the chest of the person wearing the seat-belt. Other pretensioners may move the entire retractor relative to its mounting, or may move an end part of the seat-belt or a guide through which the seat-belt passes, or may move the seat-belt buckle, relative to a mounting. The action of a pretensioner is to ensure that the seat-belt can provide an optimum retaining effecting, thus effectively retaining the person wearing the seat-belt in their seat during the accident situation and minimising the risk of the person wearing the seat-belt moving from their position in their seat to impact with part of the vehicle, such as a steering wheel or dashboard.

Pretensioners of the types described above have been associated with sensors which sense an impact, and have also been associated with sensors which are arranged to predict when an accident is about to occur.

Seat-belt pretensioner arrangements which have been associated with sensors designed to predict when an accident may occur have been associated with sensors of various different types. U.S. Pat. No. 6,394,495, for example, shows a seat-belt pretensioner arrangement in which sensors are provided to sense the braking of the vehicle, the dynamic conditions of the vehicle such as yaw angle speed and yaw angle acceleration and lateral acceleration, and also the acceleration of the vehicle. In the arrangement described an initial or "soft" tensioning of the seat-belt is achieved for excessive yaw angle speed or yaw angle acceleration, and a "hard" tightening profile, with a higher pulling force, can be achieved when other indicating signals exceed the relevant threshold values.

It has been found that the prior proposed arrangements are not sufficiently responsive to evasive manoeuvring. Manoeuvring of this type typically occurs in the brief period of time preceding an accident situation, and the present invention seeks to provide a seat-belt pretensioner arrangement which may be able to pretension a seat-belt in response to evasive manoeuvring of a motor vehicle.

SUMMARY OF THE INVENTION

According to this invention there is provided a seat-belt pretensioner arrangement, the arrangement comprising a pretensioner and a control system, the control system being configured to provide an output in response to a measured parameter relating to the steering angle of the vehicle, to control the pretensioner in response to at least the rate of change of steering angle, wherein the control system is configured to cause the pretensioner to increase the tension in the seat-belt in response to the rate of change of steering angle exceeding a first threshold, the said first threshold of the steering angle rate being a threshold which decreases with increasing longitudinal vehicle speed.

In one embodiment of the invention the control system is configured to cause the pretensioner to increase the tension in the seat-belt in response to an increase in the rate of change of steering angle. Thus, in one arrangement, as the rate of change of steering angle increases, so the tension in the seat-belt increases, so that when there is a very high rate of change of steering angle there is, consequently, a very high tension in the seat-belt.

In another embodiment of the invention, there is no increase in tension in the seat-belt until the rate of change of steering angle exceeds a first threshold value.

Conveniently the control system is also configured to activate the pretensioner in response to the steering angle passing a predetermined second threshold.

Advantageously the control system is configured such that the second threshold of the steering angle is a threshold which decreases with increasing vehicle speed.

Preferably a first processor is provided receiving input signals from a steering angle sensor and a longitudinal vehicle speed sensor and a second processor is provided receiving input signals from a differentiator which differentiates a signal from the steering angle sensor with respect to time and a velocity sensor, each processor producing one of a plurality of outputs, each representing of desired seat-belt tension, in response to the input signals, the output signals being generated when successive predetermined thresholds have been passed, the outputs of the processors being passed to a selector which selects the higher of the two output signals from the processors and which, in response to that signal, controls the pretensioner to provide a desired degree of tension in the safety belt.

In one embodiment the pretensioner comprises a retractor on which part of the seat-belt is wound and a mechanism to apply tension to the seat-belt. The mechanism may be a reversible motor. Other types of pretensioners may be used.

Conveniently the selector is configured to control the pretensioner to maintain the highest force level selected until a predetermined period of time has elapsed after the outputs of both processors have fallen to a level indicating that none of the thresholds are being exceeded.

BRIEF DESCRIPTION OF THE DRAWINGS

In order that the invention may be more readily understood, and so that further features thereof may be appreciated, the invention will now be described by way of example with reference to the accompanying drawings in which.

DETAILED DESCRIPTION OF THE INVENTION

Figure 1:
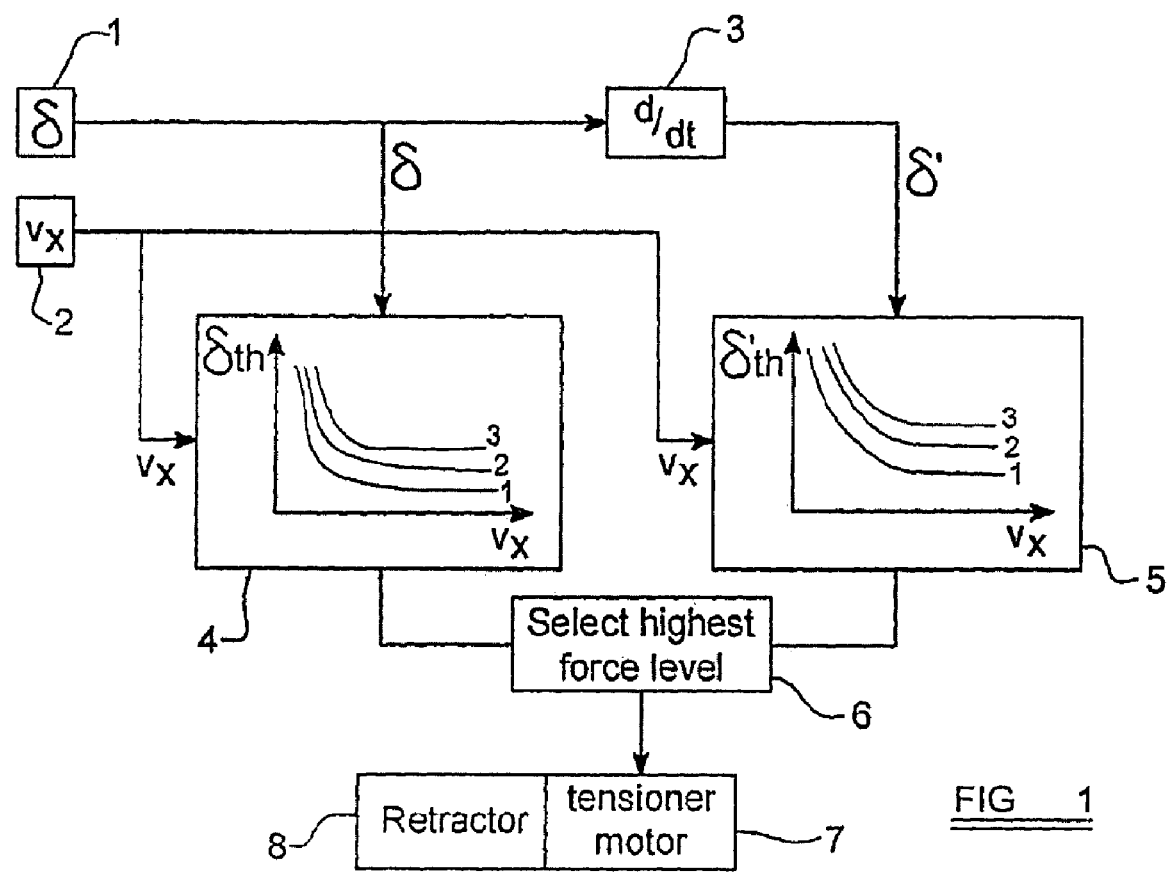
FIG. 1 is an illustrative block diagram showing sensors, processors and a seat-belt retractor.

Referring initially to FIG. 1 of the accompanying drawings, a seat-belt pretensioner arrangement is illustrated schematically.

A first sensor 1 is provided in the form of a steering angle sensor to sense the steering angle δ of a motor vehicle. The steering angle of the motor vehicle is the angle between the rolling direction of the front wheels of the vehicle and the longitudinal axis of the vehicle. When the vehicle is being driven straight the steering angle is zero, but as the steering wheel of the vehicle is turned, so that the front driving wheels become positioned to direct the vehicle around a corner, the steering angle increases. A second sensor 2 is provided in the form of a velocity sensor which senses the longitudinal velocity $v_x$ of the vehicle. The second sensor 2 may therefore be integrated with the speedometer of the vehicle.

A differentiator 3 is provided to differentiate, with respect to time, the output of the steering angle sensor. The output of the differentiator $\delta'=d\delta/dt$ is consequently indicative of the rate of change of the steering angle with respect to time or the "acceleration" of the steering angle. If the output of the differentiator is high the steering wheel of the vehicle is being rotated quickly, but if the output is low the steering wheel is being held still. The differentiator may, in one embodiment, only respond to an increase in steering angle, ignoring the rate of any decrease in steering angle.

Instead of using a differentiator to derive $\delta'$, an angular speed sensor could be used to measure $\delta'$ directly.

A control system is provided which includes two processors 4 and 5. The first processor 4 is connected to receive inputs from the steering angle sensor 1 and the velocity sensor 2. The second processor 5 is connected to receive inputs from the differentiator 3 and the velocity sensor 2.

The first processor 4 is configured to provide an output in dependence upon the value of the input signals, as will be described below in greater detail. Similarly the processor 5 provides an equivalent output. The output, in each case, is representative of a desired seat-belt tension, as will become clear from the following description. The outputs of the two processors 4 and 5 are connected to a further processor 6 which is configured to select the highest of the two desired seat-belt tensions, and to provide a corresponding output signal to a tensioner motor 7 which is associated with the safety belt retractor 8, thus controlling the tensioner motor to wind in the spindle of the retractor 8 so that a predetermined tension is present in the safety belt that is wound onto the retractor. The tension in the safety belt is then related to the higher one of the outputs of the two processors 4, 5.

The processor 4 is configured to provide four possible outputs. At low velocity there is no output and also at a relatively high velocity there is no output provided that the steering angle of the vehicle is low. However, if the steering angle exceeds a first predetermined limit, as indicated by the line 1, when the vehicle is moving, then a first level output signal corresponding to a first relatively low seat-belt tension is generated. The output signal is generated when a relatively high steering angle is generated at low velocity, and when a relatively small steering angle is generated at a higher velocity, as the line 1 defines a threshold which reduces with increasing vehicle speed.

Should, for any particular velocity, the steering angle increase, so that the threshold indicated by the line 2 of processor 4 is exceeded, then a second level output signal will be generated indicating a second higher seat-belt tension. The line 2 of processor 4 defines a second threshold which again reduces with increasing vehicle speed. The second threshold 2 is higher than the first threshold at any specific vehicle speed. Similarly, should the steering angle, at any particular velocity, further increase, so that the threshold indicated by the line 3 is surpassed, then a third level output indicative of a higher desired seat-belt tension will be generated. The line 3 defines a third threshold which is similar to but higher than the first and second thresholds. Thus the desired tension is related to the steering angle $\delta$ at any specific velocity $v_x$.

The second processor 5 operates in a similar manner, but here the rate of change of the steering angle is processed together with the velocity of the vehicle. Thus, if the rate of change of steering angle exceeds a predetermined rate for a specific velocity, so as to pass a threshold as indicated by the line 1, then an output is generated indicative of a desired seat-belt tension. In a manner similar to that described with reference to processor 4 if the rate of change of steering angle, for any particular velocity exceeds the second or third threshold as indicated by the lines 2 or 3, then appropriate signals representative of desired seat-belt tensions are generated by the processor 5. The thresholds in the second processor 5 correspond generally with the thresholds in the first processor 4, being thresholds which reduce with increasing vehicle speed. Thus the desired tension is related to the differential or rate of change of the steering angle $\delta'$ at any specific velocity $v_x$.

The selector 6 selects the higher of the two desired seat-belt tension signals that it may be receiving from the processors 4 and 5 and passes an appropriate control signal to the tensioner motor 7.

Figure 2:
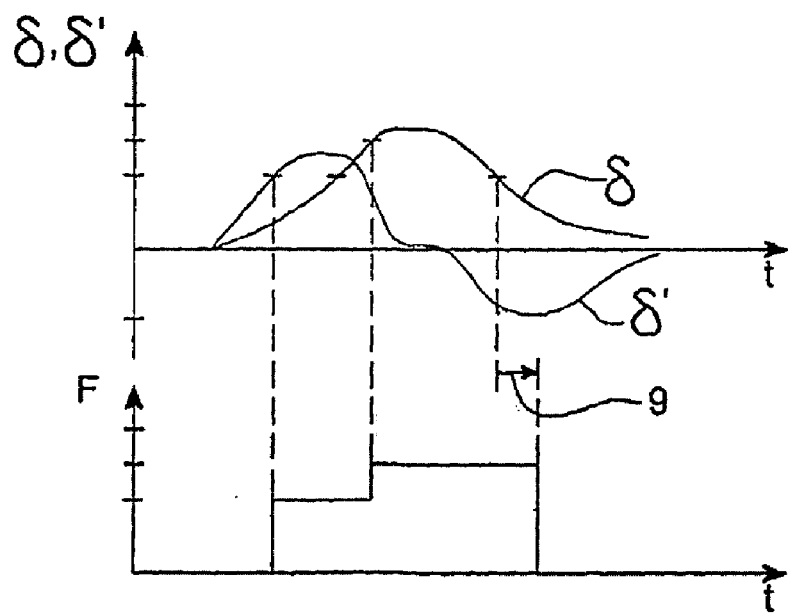
FIG. 2 is a graphical figure provided for purposes of explanation.

In a typical situation in which an accident may occur, the steering wheel may initially be moved very swiftly, thus giving the steering angle a very high rate of change, whilst not substantially changing the steering angle itself. This is shown in the upper part of the graphical figure of FIG. 2, in which the rate of change of steering angle $\delta'$ initially increases very swiftly, until it surpasses a first threshold. When it passes the first threshold the processor 5 provides a first level output signal which is passed to the tensioner motor causing tension to be applied to the seat-belt as shown in the lower part of FIG. 2. The steering angle itself will increase more gradually, and when it passes the first threshold, the processor 4 will provide a first level output, but as the selector 6 is now receiving two first level output signals, the tension applied to the seat-belt, as shown in the lower part of FIG. 2, does not increase.

Subsequently, even though the steering wheel is being turned less violently, so that the steering angle is increasing at a lower rate, nevertheless, the steering angle is still increasing until the steering angle itself exceeds the second threshold, as shown in the graphical representation at which time the processor 4 generates a second level signal passed to the selector, and the selector selects this second level signal in preference to the first level signal being received from the processor 5. Consequently the tension applied by the motor 7 increases, as can be seen in the lower part of FIG. 2. Subsequently the steering angle returns towards zero as the steering wheel of the vehicle is "straightened". At this stage the steering angle again falls below the first threshold value and the rate of change of the steering angle is also beneath the first threshold value. When both of the outputs of the processors 4 and 5 have therefore returned to zero, the selector will terminate the control signal being provided to the tensioner motor after a predetermined time delay, which is indicated by the arrow 9 appearing in FIG. 2.

It is thus to be appreciated that in response to signals from the processors 4 and 5, the selector 6 selects the higher of the desired seat-belt tension levels and will maintain the highest force level that has been selected until a predetermined period of time has elapsed after both of the input signals to the selector, representative of the speed-adjusted thresholds for steering angle and rate of change of steering angle, have each fallen below the respective first threshold.

Thus, in embodiments of the present invention, the belt tensioner may be activated solely in response to the rate of change of the steering angle passing a threshold, that threshold being speed-adjusted, so that the threshold is relatively low at high vehicle speeds, but is higher at a low vehicle speed.

It is envisaged that, in certain embodiments of the invention, the tensioner motor may be actuated to apply a predetermined tension to the seat-belt whenever the seat-belt is in use, thus helping ensure that the seat occupant is retained within the vehicle seat. The tension in the seat-belt may be increased, by the pretensioner, in response to the rate of change of steering angle, in the manner generally described above.

While the invention has been described with reference to an embodiment in which the pretensioner is incorporated into a retractor, other types of pretensioners may be used.

While the above description constitutes the preferred embodiment of the present invention, it will be appreciated that the invention is susceptible to modification, variation and change without departing from the proper scope and fair meaning of the accompanying claims.

The invention claimed is:

1. A seat-belt pretensioner arrangement, the arrangement comprising a pretensioner having a tensioner motor for tensioning a seat-belt of a motor vehicle and having at least two different tension levels for tensioning the seat-belt, the at least two tension levels being greater than zero, a steering angle sensor for measuring the steering angle of a steering wheel, a velocity sensor for measuring the longitudinal velocity of the vehicle, and a control system, the control system including a first processor that receives input signals from the steering angle sensor and the longitudinal velocity sensor, a differentiator that differentiates input signals from the steering angle sensor with respect to time to provide a rate of change of steering wheel angle, and a second processor that in parallel with the first processor receives input signals from the differentiator and the longitudinal velocity sensor, each of the processors producing in parallel with each other one of a plurality of the outputs, each representing a desired seat-belt tension in response to the input signals, the output signals being generated when successive predetermined thresholds have been passed, each succeeding threshold being associated with a greater tension level than the preceding threshold, each threshold decreasing with increasing longitudinal velocity of the vehicle as measured by the longitudinal velocity sensor, the control system further including a selector which processes the respective outputs signals of the two processors and selects the higher of the two output signals from the processors, and, in response to the higher signal, instructs the tensioner motor to provide a desired degree of tension in the seat-belt.

2. An arrangement according claim 1 wherein the control system is further configured to activate the pretensioner in response to a change in the steering angle.

3. An arrangement according to claim 1 wherein the selector is configured to control the pretensioner to maintain the highest force level selected until a predetermined period of time has elapsed after the outputs of both processors have fallen to a level indicating that none of the thresholds are being exceeded.

4. An arrangement according to claim 1 wherein the pretensioner comprises a retractor on which part of the seat-belt is wound.

* * * * *